J. J. FLYNN.
CLUTCH FOR POWER PRESSES.
APPLICATION FILED OCT. 29, 1910.
991,775.
Patented May 9, 1911.
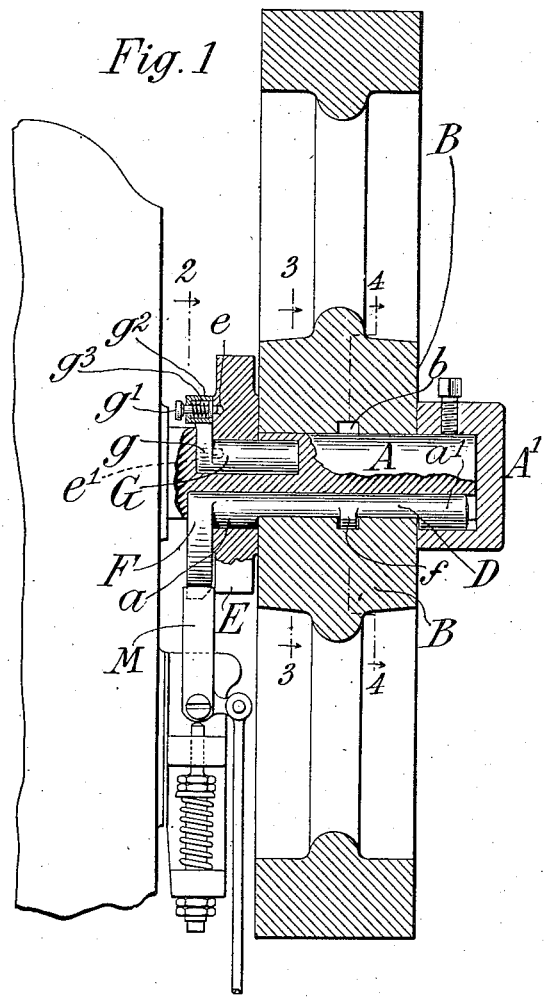
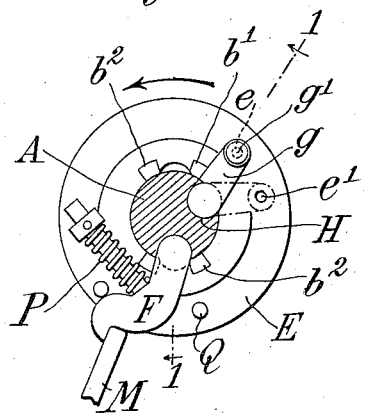
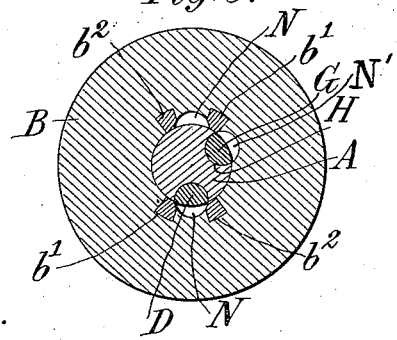
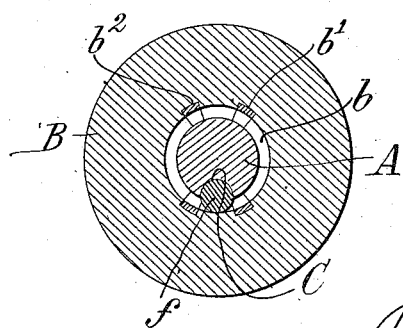
WITNESSES:
INVENTOR:
John J. Flynn
By Attorneys,

UNITED STATES PATENT OFFICE.

JOHN J. FLYNN, OF NEW YORK, N. Y., ASSIGNOR TO E. W. BLISS COMPANY, OF BROOKLYN, NEW YORK, A CORPORATION OF WEST VIRGINIA.

CLUTCH FOR POWER-PRESSES.

991,775.  Specification of Letters Patent.  Patented May 9, 1911.

Application filed October 29, 1910. Serial No. 589,686.

*To all whom it may concern:*

Be it known that I, JOHN J. FLYNN, a citizen of the United States, residing in the borough of Brooklyn, county of Kings, city and State of New York, have invented certain new and useful Improvements in Clutches for Power-Presses, of which the following is a specification.

My invention aims to provide certain improvements in clutches for power presses of the type in which an oscillating clutch key is seated in one of the parts and is oscillated into or out of engagement with a recess in the other part, and aims especially to provide certain improvements in this type of clutch whereby the life of the clutch is increased by freeing it from liability to bend and break in use.

A further object of my invention is to adapt such a clutch to turn the driven part backward when desired.

My invention also provides various improvements in detail as hereinafter explained.

The accompanying drawing illustrates a clutch in which my invention is embodied, wherein, Figure 1 is a view partly in section and partly in side elevation showing my improvements; Fig. 2 is a section on the line 2—2 in Fig. 1; Fig. 3 is a similar section on the line 3—3 in Fig. 1; and Fig. 4 is also a similar section on the line 4—4 in Fig. 1.

My invention is shown as applied to a shaft, which may be the main shaft of a power press, and to the hub of a wheel, one of which parts is constantly rotating and is to be clutched to the other at desired intervals, being designed also to automatically disengage itself after each revolution unless the operator should throw the unclutching mechanism out of operation, so as to permit another revolution. Either the hub or the shaft may be the driving part and the other the driven part. The hub surrounds the shaft and is preferably, but not necessarily, journaled directly on the shaft. The clutch-key is seated in either of said parts, preferably the driven part, being shown in the embodiment illustrated as seated in the shaft, and an arm for turning the key projects outward therefrom and is adapted to be engaged with the unclutching mechanism at each revolution unless the latter is withdrawn, as explained. Clutches of this general type are in extensive use; but a great inconvenience and expense accompanies their use by reason of the frequent breaking of the clutch key. In use, when the clutch-key is in clutching position, the force applied by the driving wheel and communicated to the shaft through the key, has a tendency to bend the key intermediate its ends forward into the adjoining recesses in the wheel and shaft, and frequently this results in the breakage of the key. According to my invention I destroy this tendency of the key to bend and break by providing a support for said key at its weakest point, and this support I preferably form by making the key full size or full round at such point, and by providing an annular channel or slot in the wheel at such point which receives the enlarged part of the key and engages the same when the key is turned to clutching position and the pulley and shaft are revolved together and effectually supports the key. According to my invention I further provide for the turning backward of the shaft by adding a second and back clutching oscillating key, and in connection therewith providing stops for holding the said back clutching key in clutching or unclutching position, so that when the said key is set to back clutching position the pulley may be turned backward in any suitable manner, as by hand, and the clutch will automatically remain in back clutching position until readjusted.

Referring to the drawings, A indicates a shaft and B a hub arranged as described. A recess C is provided in the shaft in which is seated the oscillating clutch-key D, which has also complete bearings at its opposite ends or journals $a$ $a^1$. One of these bearings as shown is in a collar E on the shaft, the other bearing as shown being in a collar or cap $A^1$ keyed on the outer end of the shaft. The key D is provided with an arm F for oscillating it.

M is a stop which is normally in the path of the arm F as the shaft rotates, and which normally throws the arm to the position indicated in Fig. 3, so that the recess N is free from the key D. When however the stop M is turned out of the path of the arm by any suitable means, as for instance by pressing a pedal adapted to swing said stop M, as indicated in Patent No. 752,100, a spring P turns the key D into the recess N as the latter arrives at a point opposite the key, and the hub in its continued rotation carries the shaft with it.

Q is a stop limiting the forward movement of the arm F under the pressure of the spring P.

For supporting the key D and preventing the same from bending and breaking when in use, I form the same with an enlarged portion $f$ in the shape of a projecting rib or collar, which as illustrated makes the said key full round at this point. A corresponding recess for the reception of the said projection $f$ is formed upon the pulley as a slot or channel $b$. This receives the said enlargement $f$, and when the shaft and pulley are unclutched permits of free rotation of the pulley upon said shaft. The said parts are so arranged, however, that when the key D is turned to clutching position the projection $f$ upon said key will rest in contact with the peripheral wall of the slot or channel $b$, and will effectually support the key. The parts being then clutched together, no wear will occur upon the supporting portion of the said projection $f$.

Hardened clutch faces $b^1$ are keyed into the hub B of the wheel or into a bushing inserted in said wheel, and contact with key D is made when the same is turned to clutching position to couple the wheel and shaft together.

For the purpose of turning the shaft A backward I provide a back clutching oscillating key G which is seated in a recess in the shaft and has an operating arm $g$ for adjusting it to position, and has means for automatically maintaining it in adjusted position. As illustrated, such means comprise a spring-actuated headed stop-pin $g^1$ which is mounted in a box $g^2$ at the end of said arm, and which is pressed by a spring $g^3$ into recesses $e$ $e^1$ in the collar E. The recess $e$ maintains the back clutching key in inoperative position, and recess $e^1$ maintains the said key in back clutching position in the particular embodiment of my invention illustrated wherein the driving pulley in its driving motion revolves counter clockwise, as indicated by the arrow in Fig. 2. To adjust the back clutching key G to its operative or back clutching position, a back-clutching recess $N^1$ in the hub B is preferably provided which is alined with the key G when the key D is released, or more than one of such recesses may be provided if desired, or the driving pulley may be turned until recess N is alined with key-way H in the shaft in which said back clutching key is situated, whereupon the said key G is turned preferably by hand, and stop $g^1$ is released in position to enter recess $e^1$, whereupon the pulley may be turned preferably by hand, causing the hardened clutch faces $b^2$ to abut against key G and to turn the shaft.

Although I have described with great particularity the mechanical construction in which I have embodied my invention, I do not regard the invention as necessarily limited to the precise features of construction illustrated, as various modifications in the details and combinations of parts are possible to those skilled in the art, without departing from my invention as defined in the following claims.

I claim as my invention:—

1. In a clutch, the combination with driving and driven parts comprising a shaft and a hub surrounding the same, of an oscillating clutch key seated in one of said parts, means for turning the same to clutch the parts, and a support for said key located between said shaft and hub and adapted to maintain the key when the same is in clutch.

2. In a clutch, the combination with driving and driven parts comprising a shaft and a hub surrounding the same, of an oscillating clutch key seated in one of said parts, means for turning the same to clutch the parts, and means for supporting the key when in clutch comprising an enlargement upon the key and a corresponding slot upon the associated clutch member, adapted to be engaged by said enlargement upon the key when the key is turned to clutching position.

3. In a clutch, the combination with a shaft of a hub surrounding the same, said shaft having a recess, an oscillating clutch key seated in said recess, means for turning said key to clutch said hub and shaft, means for turning said key to unclutching position and means for supporting the key when in clutch comprising an enlargement upon the key and a corresponding seat in the hub which is adapted to be engaged by said enlargement when the key is turned to clutching position.

4. In a clutch, the combination with a shaft of a hub surrounding the same, said shaft having a recess, an oscillating part round clutch key seated in said recess, means for turning said key to clutch said hub and shaft, said key having a full round portion intermediate its ends and a slot in the hub adapted to receive said full round portion and to support the key when turned to clutching position.

5. In a clutch, the combination with driving and driven parts comprising a shaft and a hub surrounding the shaft, of a clutch adapted to connect said hub and shaft for driving, and a second clutch adapted to connect said hub and shaft for back driving and to prevent relative movement of said hub and shaft in either direction comprising an oscillating clutch key seated in one of said parts means for adjusting said key to clutching or unclutching position and a stop for maintaining said clutch key in clutching or unclutching position.

6. In a clutch, the combination with driving and driven parts comprising a shaft and a hub surrounding the shaft, of a clutch adapted to connect said hub and shaft for driving, and a second clutch adapted to connect said hub and shaft for back driving comprising an oscillating clutch key seated in one of said parts and a sliding spring actuated stop pin carried by said key, and a plurality of recesses in said hub adapted to receive and hold said pin.

7. In a clutch, the combination with driving and driven parts comprising a shaft and a hub surrounding the same, of an oscillating clutch key seated in one of said parts, means for turning the same to clutch the parts, and a support for said key located between said shaft and hub and adapted to maintain the key when the same is in clutch, and a second clutch adapted to connect said hub and shaft for back driving and to prevent relative movement of said hub and shaft in either direction comprising an oscillating clutch key seated in one of said parts and a stop for maintaining said clutch key in clutching or unclutching position.

8. In a clutch, the combination with a shaft of a hub surrounding the same, said shaft having a recess, an oscillating clutch key seated in said recess, means for turning said key to clutch said hub and shaft, means for turning said key to unclutching position and means for supporting the key when in clutch comprising an enlargement upon the key and a corresponding seat in the hub which is adapted to be engaged by said enlargement when the key is turned to clutching position, and a second clutch adapted to connect said hub and shaft for back driving and to prevent relative movement of said hub and shaft in either direction comprising an oscillating clutch key seated in one of said parts and a sliding spring actuated stop pin carried by said key, and a plurality of recesses in said hub adapted to receive and hold said pin.

In witness whereof, I have hereunto signed my name in the presence of two subscribing witnesses.

JOHN J. FLYNN.

Witnesses:
G. W. A. MURRAY,
JOHN D. McINTYRE.